Figure 1:
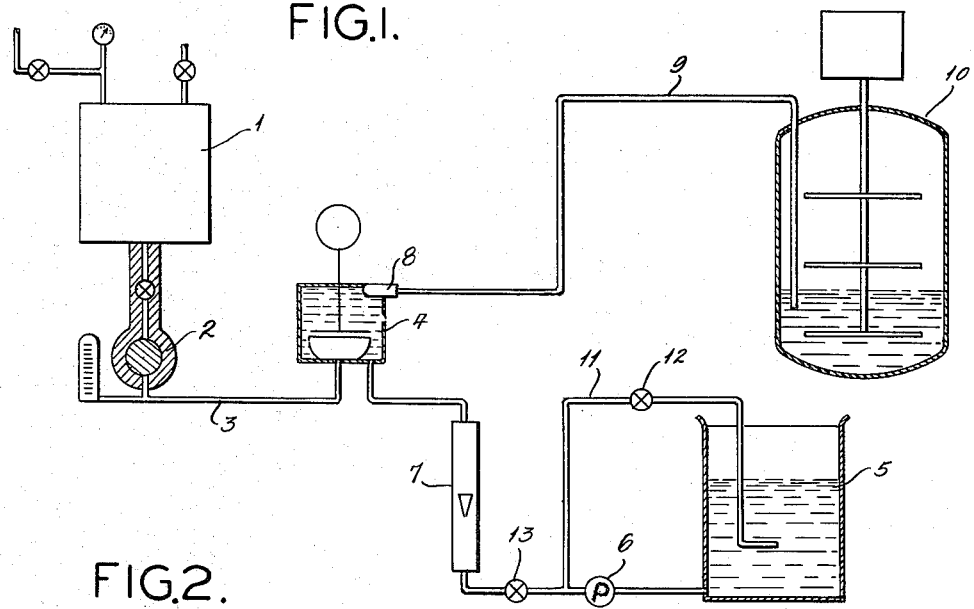

Dec. 26, 1961 R. L. COOK ETAL 3,014,246
PROCESS OF MANUFACTURING PROPELLENT POWDER
Filed Oct. 4, 1954

INVENTORS:
RALPH L. COOK
EUGENE A. ANDREW
By Bruninga and Sutherland
ATTORNEYS.

3,014,246
PROCESS OF MANUFACTURING PROPELLENT POWDER
Ralph L. Cook, Alton, Ill., and Eugene A. Andrew, St. Louis, Mo., assignors to Olin Mathieson Chemical Corporation, East Alton, Ill., a corporation of Virginia
Filed Oct. 4, 1954, Ser. No. 460,014
3 Claims. (Cl. 18—47.2)

This invention relates generally to the manufacture of propellent powder, and particularly to the manufacture of spherical and near spherical grains of smokeless powder.

In United States Patent No. 2,027,114, granted January 7, 1936, there is disclosed a process of manufacturing smokeless powder wherein droplets of lacquer, composed of smokeless powder base and solvent, are solidified while suspended in a non-solvent medium. Such a process of manufacturing propellent powder has come to be known among those skilled in the art as the "globular powder" process. The technique of controlling the globular powder process so as to produce grains having various physical and chemical properties is further disclosed in United States Patents Nos. 2,160,626, granted May 30, 1939, 2,213,255, granted September 3, 1940, and 2,375,175, granted May 1, 1945. These patents disclose variations in the basic technique of manufacturing globular powder whereby to control the character, uniformity, and ballistic properties of the powder produced.

While the patent to Olsen, 2,027,114, discloses inter alia, a species of the globular powder process wherein the smokeless powder base was dissolved in solvent to produce the lacquer wholly out of the presence of the suspending liquor, in practice that species was characterized by less chemical uniformity of grains than the species wherein the base was dissolved by the solvent in the presence of the suspending liquor. On the other hand, there are many conditions encountered in the practice of the globular powder process wherein the first-mentioned species offers advantages over the second-mentioned species. For example, in cases where it is desired to incorporate in the finished grains a material which is either not mutually soluble with the lacquer, or which is soluble in the suspending liquor, it is possible by mechanical means to distribute such material with good uniformity throughout a lacquer which is made separate and apart from the suspending liquor; but it is practically impossible to secure anything approaching uniform distribution of such a material where the lacquer is made in the presence of the suspending liquor. Calcium carbonate is an example of such a material which, being insoluble in the lacquer, can be dispersed in the lacquer (out of the presence of the suspending liquor) with such uniformity that each resulting globular powder grain ought theoretically to contain very nearly the same percentage of calcium carbonate. It was observed, however, that in a given batch, while some grains contained the desired amount of calcium carbonate, others contained less, and still others, none at all. We have reasoned that this non-uniformity of product was attributable to the fact that in the conventional process lacquer in bulk is added to the non-solvent liquor and broken down to the final particle size. The breaking down process extends over a considerable time period—one globule may attain its final size immediately while a larger one is subdivided a number of times before attaining its final size—so that there is a substantial hiatus between the final formation of the first and last globules. This hiatus affects the uniformity with which the additive is retained by the individual globules of lacquer. When the additive is not soluble in the lacquer, loss thereof from the lacquer depends upon the amount of kneading performed upon a given body of lacquer in reducing it to its final size. The sooner such a body of lacquer attains its final size, the sooner its subdivision (with a consequent exposure of new surfaces) ceases and the less of such additive it will lose. On the other hand, where the additive is substantially soluble in the suspending liquor, it is lost from the lacquer globules by leaching. Leaching is, in part, a function of the total surface area (as related to total volume); thus at their final size the lacquer bodies have a large surface area compared to their volume, and the first ones to reach their final size are subjected to a maximum of leaching. At the early stages of the operation, there is a comparatively large volume of suspension liquor available to act on the few small bodies that are immediately reduced to final size, whereas the large mass of lacquer is almost impervious to leaching action at that time. The small bodies which are formed later are also subjected to leaching, but in the meantime, two things have happened which minimize the effect of it. First, the time to which later formed bodies are subjected to leaching is less than the time to which the earlier formed bodies are subjected to leaching. Second, the concentration of material being leached is increasing in the suspending liquor as the operation progresses, and hence the driving force governing the leaching force is progressively reduced as the operation proceeds.

Thus an additive, like calcium carbonate, which is both insoluble in the lacquer and substantially soluble in the liquor is subject to both types of loss, but they do not balance each other because of the time interval involved which contributes to the difference between the first and last formed lacquer bodies. Accordingly, it is an object of the present invention to provide a globular powder process wherein the lacquer is made out of the presence of the suspending liquor, but wherein the above-described non-uniformity among grains of the same batch is reduced or substantially eliminated.

In accordance with the present invention, the smokeless powder base is dissolved in solvent out of the presence of the suspending liquor and any additives which are desired in the resultant globular grains are mechanically mixed with the resultant lacquer to secure the desired uniformity of distribution therein—all prior to the time the lacquer is brought into contact with the suspending liquor. Examples of such additives are calcium carbonate, carbon black, tin, nitroguanidine, or any other material including water, whose presence in the lacquer will produce or induce desired characteristics (physical or chemical) in the resulting grains. Having uniformly distributed the additive, or additives, throughout the lacquer, the lacquer is broken down into presized bodies of final volume almost instantly. These bodies are immediately suspended in a relatively small volume of suspending liquor, and the resulting suspension is immediately removed from the locus at which it was made. As more lacquer is broken down, aliquot portions of suspending liquor are added so that the mass ratio between the lacquer and liquor is constant and concentration change effects are minimized. Thus a series of small increments of lacquer and liquor are added together and changed from their initial to their final (volume and suspension) conditions before the increments of suspension are combined together in an appropriate vessel in which the shaping and hardening phases of the globular powder process are carried out.

The subdivision and initial suspension of the lacquer bodies may be, and preferably are, carried out at a temperature such that the presized lacquer bodies are "frozen," i.e., not sufficiently fluid to yield to the forces of interfacial tension and not sufficiently tacky as to stick on casual contact or to join in a continuous phase. This enables the suspension to be moved through pipelines for considerable distances, or stored temporarily, with no more agitation than what is required to keep the suspension moving, which is far less than the degree of agitation heretofore deemed necessary to avoid coalescence of the subdivided lacquer bodies. Indeed, the agitation may be suspended and the lacquer bodies allowed to settle on each other for some minutes without objectionable results when they are thus "frozen."

The addition of a small amount of water to the lacquer and the uniform distribution thereof throughout the lacquer prior to contact with the suspending liquor has several advantages, provided the amount of water within each such presized body of lacquer be quantitatively controlled and the water content of the individual presized bodies of lacquer can be made to remain uniform. Quantitative control of the amount of water in a presized body of lacquer is impossible, however, where the body of lacquer is undergoing agitation of such violence as to amount to attrition in a suspending liquor consisting largely of water, because agitation of such violence not only tends to emulsify more water into the lacquer, but each new lacquer surface exposed during such attrition will permit the escape of some water from within the lacquer body. Accordingly, when water is the additive, it is essential not only that agitation of violence such as to emulsify water into the lacquer be avoided, but that each presized lacquer body be reduced to its final size with but one severance in the presence of the suspending liquor (in contra-distinction to a process of subdivision wherein a given body of the lacquer might be divided in twain, the resulting halves divided in twain, the resulting quarters divided in twain, etc.). The use of water as the additive to the lacquer, with quantitative control, enables the manufacture of globular grains having porous interiors (with continuous exteriors), the degree of porosity being controlled by the amount of water inside each presized lacquer body, and hence, by controlling the amount of water inside each presized body, globular powder grains of greater or less gravimetric density may be produced.

Irrespective of whether additives are incorporated in the lacquer, the process of the present invention, insofar as it involves presizing and suspending the lacquer bodies in a relatively small volume of suspension liquor and immediately removing the resultant suspension from the locus at which it was made, is of advantage. Accordingly, the invention is not limited to lacquers in which additives are incorporated.

Figure 2:
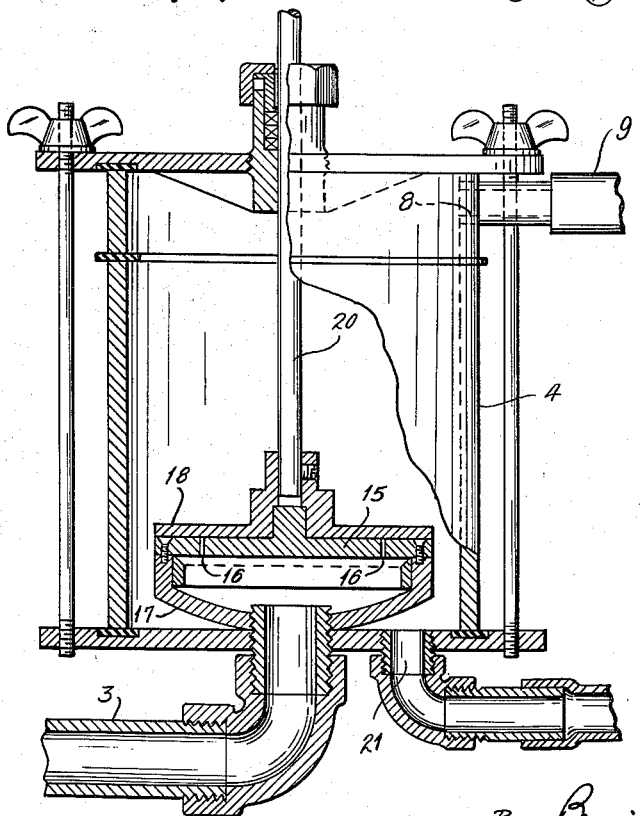

In the accompanying drawings:

FIGURE 1 is a flow sheet showing the co-relation of the several steps of the process and diagrammatically illustrating the apparatus employed; and FIGURE 2 is a view in side elevation (part being broken away to reveal the relationship of the elements), partly in section, of an apparatus for subdividing a stream of lacquer into presized bodies.

Referring now to FIGURE 1 of the drawings, a lacquer pot 1 is connected through a suitable pump 2 and a pipeline 3 to a grainer 4 of the type to be described in greater detail hereinafter. A supply of suspending liquor is maintained in a tank 5, which is connected through a pump 6 and a fluid measuring device 7 to the grainer 4. The grainer 4 is provided with a tangential discharge 8, which is connected through pipeline 9 with a still 10 of the character usually employed in the globular powder process.

A bypass line 11 extends from the output side of pump 6 to tank 5. The bypass line is provided with a valve 12; the line between pump 6 and measuring device 7 is provided with a valve 13; and said valves 12 and 13 may be automatically controlled by the measuring device 7, in order to assure constancy of the stream of suspending liquor delivered to grainer 4, and to permit regulation thereof in order to maintain a fixed ratio of suspending liquor to lacquer as delivered to grainer 4. The lacquer pot 1 is preferably a closed vessel maintained under constant pressure by the introduction of inert gas which is admitted to replace, volume for volume, the lacquer as removed therefrom, and to assist in feeding the pump. Provision may be made for continuously introducing lacquer into pot 1. In the form illustrated in FIGURE 1, the pot 1 is proportioned to accommodate at one charge the quantity of lacquer which will be utilized in one batch operation of still 10, but it will be understood that the output of a plurality of such pots may be concurrently delivered to the same still, or the output from a single pot may be divided among a plurality of stills.

The grainer 4, shown in detail in FIGURE 2, consists of a closed vessel proportioned to accommodate about a half-gallon, i.e., about one-half percent of the total batch charge for still 10. Centrally the bottom of the vessel, an orifice plate 15 having a plurality of orifices 16 is provided. The lower side of the orifice plate is encased by a housing 17, which in turn is connected to pipe 3 leading to lacquer pump 2. Above the orifice plate 15, a rotor having four radially extending blades 18 is provided. The blades 18 ride upon the upper surface of orifice plate 15 and the rotor is driven from a suitable motor on the exterior of the vessel through shaft 20. Adjacent and below housing 17, the grainer 4 is provided with an inlet opening 21, which in turn is connected to the pipeline leading to flow regulator 7. At the upper end of the grainer 4, tangential discharge opening 8 is provided.

In the operation of the system, lacquer is pumped through orifices 16 at a controlled rate concurrently with the introduction of suspending liquor through orifice 21 at a controlled rate, and concurrently with rotation of blades 18 at a predetermined speed. The size of orifices 16 depends upon the size of the grains desired; for example, to produce grains the majority of which lie between the limits of 0.025 and 0.034 inch in diameter, the orifices may be 0.30±0.005 inch in diameter, whereas to produce grains the majority of which lie between the limits of 0.016 and 0.025 inch in diameter, the orifices may be 0.020±0.005 inch in diameter. With an orifice of given size, the speed of rotation of blades 18 is coordinated with the rate of flow of the lacquer through the orifices so as to produce lacquer bodies of the desired diameter to length ratio, which is substantially 1:1. It is contemplated, of course, that a variety of orifice plates 15, each having orifices of different diameter, may be provided for alternative use in the grainer; it being understood that when a plate having a larger orifice is used, the speed of rotation of blades 18 is reduced so as to maintain the preferable condition that the presized bodies of lacquer severed at the mouths of openings 16 are approximately as broad as they are long.

As the lacquer emerges through orifices 16 and is cut into presized bodies by the blades 18, the presized bodies are immediately suspended in the suspending liquor which is being concurrently delivered into the grainer 4. Rotation of the blades 18 provides sufficient agitation to maintain the presized bodies in suspension and as additional liquor and lacquer is introduced into grainer 4, the suspension is discharged through tangential outlet 8, and pipeline 9, into still 10, which is provided with the usual agitator and is operating to maintain the suspension of presized lacquer bodies discharged therein from grainer 4. When the entire batch charge has been delivered into still 10, the shaping, and subsequently the hardening, phases of the globular powder process are carried out in the still.

As a typical example of the lacquer to be employed, 135 pounds of ethyl acetate may be mechanically mixed with one-eighth pound of calcium carbonate and one-half pound of diphenylamine. The mixture is heated to 50° C. and slowly incorporated with 80 pounds of water-wet nitrocellulose (56 pounds of dry nitrocellulose). These mixing operations are carried out in any suitable mechanical mixer having provision for external heating, and continued until a homogeneous lacquer results. During the mixing operation, the temperature of the mixture is preferably raised from 50° C. to about 60° C. The resultant lacquer, at a temperature of 60° C., has a viscosity of approximately nine seconds, measured by the following method: a stainless steel rod 5/16 inch in diameter weighing 60 grams, having a flat end and a circumferential mark 25/16 inches from the flat end, is placed upon a body of the lacquer flat end down, and the time required for the rod to sink to the 25/16 inch depth mark is considered the viscosity of the lacquer.

The nitrocellulose employed may be of the same character as that heretofore employed in the practice of the globular powder process, as for example, a nitrocellulose having a nitration of 13.2% N (or a blend averaging about that value) and an inherent viscosity comparable to that which is bought on the market, as 6–10 seconds. While the invention is by no means limited to any particular degree of nitration, or any particular degree of inherent viscosity of nitrocellulose, certain variations in the procedure and proportions of the various materials are necessarily made when the grade of nitrocellulose is changed. In actual practice when a change of nitrocellulose viscosity is encountered or a change in the water content of the solution encountered, adjustment to the proper working viscosity may readily be made by appropriate variation of either the nitrocellulose content or the solvent content of the lacquer.

The suspending liquor for use in connection with the above-described lacquer may be prepared by dissolving 14 pounds of gum arabic in 50 pounds of hot water. This solution is filtered into 700 pounds of water at 60° C. and thoroughly mixed. 27 pounds of sodium sulphate are then dissolved in the solution, but care should be exercised that the sodium sulphate does not cake on the bottom of the mixing vessel. 15 pounds of ethyl acetate are then added to the solution and the temperature thereof is maintained at 60° C.

To recapitulate the operation of the process, the aforesaid 215 5/8 pounds of lacquer are placed in lacquer pot 1, and the aforesaid 806 pounds of suspending liquor are placed in tank 5. With the speed of rotation of blades 18 set at the desired value (as for example, 1000 r.p.m. for a four-bladed cutter cooperating with orifices 0.040 inch in diameter, located 1 3/8 inches from the center of the orifice plate), the suspending liquor is pumped into the grainer 4 (at the rate of 6½ pounds per minute). The lacquer is concurrently pumped from pot 1 into grainer 4 (at a rate of 2.6 pounds per minute) wherein the filaments of lacquer extruded through orifices 16 are cut off into cylinders (0.040 inch long and 0.040 inch in diameter) and immediately suspended in the suspending liquor contained in grainer 4. As the operation continues, the suspension of cut lacquer filaments in the suspending liquor is discharged by grainer 4 through outlet 8 and pipe 9 in the still 10. As discharged from grainer 4, the suspension consists of one pound of presized lacquer bodies to each 2.2 pounds of suspending liquor. During this period, the temperature of the several components is maintained at or below 60° C., and the contents of still 10 are maintained under mild agitation. When the entire charge has reached still 10, its level therein will be at the level of the upper paddle shown in the drawing. The temperature of the contents of the still is then raised to 70° C. over a period of one hour, during which time agitation sufficient to maintain the presized lacquer bodies in suspension is continued. By the time the temperature of the still contents reaches 70° C., the presized lacquer bodies (which were originally in the geometric shape of cylinders) will have assumed spherical shape. If, as taught in Schaefer Patent No. 2,160,626, it is desired to produce high density grains and a salt has been incorporated in the suspending medium to accomplish that result, the temperature of the still is maintained at about 70° C. for about two hours in order to remove the water which is emulsified within the suspended bodies of lacquer. The hardening phase of the process may then be proceeded with. This involves removal of the solvent from the suspended presized lacquer bodies and may be accomplished either by further increasing the temperature of the still contents to about 100° C. over a period of four hours, or by reducing the pressure on the still contents to about 7½ pounds per square inch absolute while the temperature therein is maintained at 70° C. for a period of six hours. After the suspended globules have become hardened, they are recovered from the still 10 and dewatered in the usual manner. The product resulting from the above-described series of operations with the above-described lacquer and suspension liquor consisted of 50 pounds of well rounded grains, over 80% of whose diameters were within the size range of from 0.034 to 0.041 inch, and having a gravimetric density of 0.95.

Whereas in the conventional practice of the globular powder process (where the lacquer is made out of contact with the suspension liquor) during the introduction of the lacquer into the liquor, the ratio of lacquer to liquor progressively increases from zero to the final value of, say, 1:2, which final value is achieved only at the end of the introduction, the present invention contemplates that the ratio of lacquer to liquor is maintained substantially constant throughout the sizing and initial suspension operations and the charging of still 10. After all of the lacquer has been subdivided and the suspension thereof deposited in still 10, additional suspending liquor may of course be introduced into the still; but in view of the fact that the additional suspending liquor is being added to an already existing suspension of lacquer bodies, all of the suspended lacquer bodies are concurrently exposed, and hence exposed for the same length of time to the increasing proportion of suspension liquor (in contrast with what the situation would be if the lacquer were added to the suspension liquor).

From the foregoing description, those skilled in the art should readily understand that the invention accomplishes its objects and provides not only a process whereby additives incorporated into lacquer will, with assurance, be carried over in the desired proportion into the final rounded globules without one globule having lost more of such additive than another, but by carrying out the operation of subdivision and initial suspension at a temperature where the lacquer is "frozen," the resultant suspension can be transported through pipelines for great distances or maintained in storage, provided the temperature is not permitted to exceed that at which the suspended lacquer bodies will become tacky. Accordingly, although the globular powder process is distinctly a batch process insofar as rounding and hardening are concerned, the graining operation may be continuous to supply a plurality of stills in which rounding and hardening operations are being carried out.

While in the foregoing specification a general description of the invention has been supplemented by a specific example, it is not to be understood that the invention is limited to the particular materials, proportions, temperatures, or other conditions hereinbefore specified for the purpose of illustration. On the contrary, those skilled in the art will understand that there are many variables in the globular powder process, and those variables are equally applicable to the present improvement upon that process. While the present improvement is peculiarly applicable to the species of the globular powder process wherein the lacquer is made out of contact with the suspending liquor, certain features of the invention, as, for example, the freezing of the subdivided lacquer bodies, are applicable to the species of the globular powder process wherein the lacquer is made in the presence of some suspending liquor. Consequently, it is to be distinctly understood that the foregoing disclosure is merely illustrative and it is contemplated that such modifications and variations in the specific embodiment disclosed as may suggest themselves to those skilled in the art to meet the exigencies arising from time to time in practical operation, be made without departing from the spirit of the invention or the scope of the appended claims.

Having thus described the invention, what is claimed and desired to be secured by Letters Patent is:

1. A process of making globular powder grains comprising dissolving a smokeless powder base in a solvent therefor to form a lacquer, extruding the lacquer at a constant rate through an orifice into a stream of a suspending liquor substantially immiscible with the solvent, the liquor flowing at a constant rate, cutting uniformly sized sections from the extruded lacquer as it emerges from the orifice thus suspending the lacquer sections in the liquor, flowing the liquor with the lacquer bodies suspended therein to a hardening still and thereafter rounding and hardening the suspended lacquer bodies in the still.

2. A process of making globular powder grains comprising dissolving a smokeless powder base in a solvent therefor to form a lacquer, subdividing a stream of the lacquer flowing at a constant rate, and suspending the subdivided lacquer bodies in a stream of suspending liquor also flowing at a constant rate, the liquor being substantially immiscible with the solvent, flowing the liquor with the lacquer bodies suspended therein to a hardening still, and thereafter rounding and hardening the suspended lacquer bodies in the still.

3. The process of claim 2 wherein at the time of subdivision and initial suspension the viscosity of the lacquer bodies is above the value at which they are rounded in suspension.

References Cited in the file of this patent

UNITED STATES PATENTS

| | | |
|---|---|---|
| 134,438 | Oliver | Dec. 31, 1872 |
| 648,723 | Brown | May 1, 1900 |
| 2,021,837 | Davidson | Nov. 19, 1935 |
| 2,027,114 | Olsen et al. | Jan. 7, 1936 |
| 2,510,574 | Greenhalgh | June 6, 1950 |
| 2,691,800 | Seavey | Oct. 19, 1954 |
| 2,740,705 | O'Neill et al. | Apr. 3, 1956 |